US012801489B2

(12) United States Patent
Yoshida

(10) Patent No.: US 12,801,489 B2
(45) Date of Patent: Nov. 17, 2026

(54) ERROR CORRECTION CODING DEVICE AND ERROR CORRECTION CODING METHOD

(71) Applicant: Mitsubishi Electric Corporation, Tokyo (JP)

(72) Inventor: Tsuyoshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 79 days.

(21) Appl. No.: 19/000,063

(22) Filed: Dec. 23, 2024

(65) Prior Publication Data

US 2025/0130889 A1 Apr. 24, 2025

Related U.S. Application Data

(63) Continuation of application No. PCT/JP2022/031969, filed on Aug. 25, 2022.

(51) Int. Cl.
*G06F 11/10* (2006.01)

(52) U.S. Cl.
CPC ................................ *G06F 11/1004* (2013.01)

(58) Field of Classification Search
CPC ........... G06F 11/1004; H03M 13/6356; H03M 13/45; H03M 13/611; H03M 13/251; H03M 13/29; H04L 2001/0098; H04L 1/0041; H04L 1/0042; H04L 1/0058
See application file for complete search history.

(56) References Cited

U.S. PATENT DOCUMENTS

| | | | | |
|---|---|---|---|---|
| 2010/0287450 | A1 | 11/2010 | Sugihara et al. | |
| 2021/0075515 | A1 | 3/2021 | Mikami et al. | |
| 2022/0006532 | A1* | 1/2022 | Elzanaty | H04B 10/503 |
| 2022/0038117 | A1 | 2/2022 | Sugiyama et al. | |
| 2022/0038204 | A1 | 2/2022 | Sugiyama et al. | |

(Continued)

FOREIGN PATENT DOCUMENTS

| | | |
|---|---|---|
| JP | 2010-263476 A | 11/2010 |
| JP | 2021-44681 A | 3/2021 |

(Continued)

OTHER PUBLICATIONS

Bose et al., "On A Class of Error Correcting Binary Group Codes," Information and Control, Mar. 1960, vol. 3, No. 1, pp. 68-79.

(Continued)

*Primary Examiner* — Thien Nguyen
(74) *Attorney, Agent, or Firm* — Birch, Stewart, Kolasch & Birch, LLP

(57) ABSTRACT

An error correction coding device is configured to include an exclusive OR operating unit to acquire a plurality of information bit strings that are labels of respective multilevel modulation symbols from a frame in which a plurality of information bit strings that are labels of the plurality of multilevel modulation symbols are arranged, and operate an exclusive OR of a plurality of information bits that are labels of the respective multilevel modulation symbols, and a soft decision error correction coding unit to generate soft decision error correction redundancy bits by performing soft decision error correction coding on a plurality of operation results of the exclusive OR by the exclusive OR operating unit.

5 Claims, 10 Drawing Sheets

(56) References Cited

U.S. PATENT DOCUMENTS

| | | | | |
|---|---|---|---|---|
| 2023/0006769 | A1* | 1/2023 | Yoshida | H04L 1/0058 |
| 2024/0056099 | A1 | 2/2024 | Yoshida et al. | |

FOREIGN PATENT DOCUMENTS

| | | | |
|---|---|---|---|
| JP | 2022-27455 | A | 2/2022 |
| WO | WO 2021/166203 | A1 | 8/2021 |
| WO | WO 2021/199690 | A1 | 10/2021 |

OTHER PUBLICATIONS

International Search Report for PCT/JP2022/031969 filed on Aug. 25, 2022 and mailed on Nov. 1, 2022.

Japanese Notice of Reasons for Refusal, issued in JP Patent Application No. 2022-575179 dated Mar. 14, 2023.

Kakizaki et al., "Low-complexity Channel-polarized Multilevel Coding for Probabilistic Amplitude Shaping", 2022 Optical Fiber Communications Conference and Exhibition (OFC), Mar. 6-10, 2022, total 3 pages.

Smith et al., "Staircase codes: FEC for 100 GB/s OTN," IEEE/OSA Journal of Lightwave Technology., vol. 30, No. 1, pp. 110-117, Jan. 2012, doi: 10.1109/JLT.2011.2175479.

Sugitani et al., "Partial Multilevel Coding with Probabilistic Shaping for Low-power Optical Transmission", IEICE, 2019 24th OptoElectronics and Communications Conference (OECC) and 2019 International Conference on Photonics in Switching and Computing (PSC), Paper TuB1-5, Jul. 7-11, 2019, total 3 pages.

Sukmadji et al., "Zipper Codes: Spatially-Coupled Product-Like Codes with Iterative Algebraic Decoding," Canadian Workshop on Information Theory (CWIT), Hamilton, ON, Canada, Jun. 2019, pp. 1-6, doi: 10.1109/CWIT.2019.8929906.

Yoshida et al., "Fundamental Technologies for Advanced DSP toward Massively Parallel and Sliced Optical Networks", Proceedings of the 2022 IEICE General Conference, IEICE, General Conference 2022, Mar. 15-18, 2021 (online), total 4 pages.

Extended European Search Report for European Application No. 22956492.7, dated Aug. 8, 2025.

* cited by examiner

FIG. 11A

| | | Real Part | | | | | | | |
|---|---|---|---|---|---|---|---|---|---|
| | | -7 | -5 | -3 | -1 | 1 | 3 | 5 | 7 |
| Imaginary Part | 7 | 110<br>010 | 111<br>010 | 101<br>010 | 100<br>010 | 000<br>010 | 001<br>010 | 011<br>010 | 010<br>010 |
| | 5 | 110<br>011 | 111<br>011 | 101<br>011 | 100<br>011 | 000<br>011 | 001<br>011 | 011<br>011 | 010<br>011 |
| | 3 | 110<br>001 | 111<br>001 | 101<br>001 | 100<br>001 | 000<br>001 | 001<br>001 | 011<br>001 | 010<br>001 |
| | 1 | 110<br>000 | 111<br>000 | 101<br>000 | 100<br>000 | 000<br>000 | 001<br>000 | 011<br>000 | 010<br>000 |
| | -1 | 110<br>100 | 111<br>100 | 101<br>100 | 100<br>100 | 000<br>100 | 001<br>100 | 011<br>100 | 010<br>100 |
| | -3 | 110<br>101 | 111<br>101 | 101<br>101 | 100<br>101 | 000<br>101 | 001<br>101 | 011<br>101 | 010<br>101 |
| | -5 | 110<br>111 | 111<br>111 | 101<br>111 | 100<br>111 | 000<br>111 | 001<br>111 | 011<br>111 | 010<br>111 |
| | -7 | 110<br>110 | 111<br>110 | 101<br>110 | 100<br>110 | 000<br>110 | 001<br>110 | 011<br>110 | 010<br>110 |

FIG. 11B

| | | Real Part | | | | | | | |
|---|---|---|---|---|---|---|---|---|---|
| | | -7 | -5 | -3 | -1 | 1 | 3 | 5 | 7 |
| Imaginary Part | 7 | 1 | 0 | 1 | 0 | 1 | 0 | 1 | 0 |
| | 5 | 0 | 1 | 0 | 1 | 0 | 1 | 0 | 1 |
| | 3 | 1 | 0 | 1 | 0 | 1 | 0 | 1 | 0 |
| | 1 | 0 | 1 | 0 | 1 | 0 | 1 | 0 | 1 |
| | -1 | 1 | 0 | 1 | 0 | 1 | 0 | 1 | 0 |
| | -3 | 0 | 1 | 0 | 1 | 0 | 1 | 0 | 1 |
| | -5 | 1 | 0 | 1 | 0 | 1 | 0 | 1 | 0 |
| | -7 | 0 | 1 | 0 | 1 | 0 | 1 | 0 | 1 |

ERROR CORRECTION CODING DEVICE AND ERROR CORRECTION CODING METHOD

CROSS REFERENCE TO RELATED APPLICATION

This application is a Continuation of PCT International Application No. PCT/JP2022/031969, filed on Aug. 25, 2022, which is hereby expressly incorporated by reference into the present application.

TECHNICAL FIELD

The present disclosure relates to an error correction coding device and an error correction coding method.

BACKGROUND ART

There is a transmission device including an error correction coding device that generates soft decision error correction redundancy bits by performing soft decision error correction coding on multilevel modulation symbols (see, for example, Non Patent Literature 1).

The bit string indicating the multilevel modulation symbol includes most significant bits corresponding to the number of dimensions, middle bits corresponding to the number of dimensions×K (K is an integer equal to or more than 1), and least significant bits corresponding to the number of dimensions. The middle bits are bits that are present between the most significant bit and the least significant bit.

The error correction coding device acquires each multilevel modulation symbol from a frame in which a plurality of multilevel modulation symbols is arranged. The error correction coding device generates soft decision error correction redundancy bits by performing soft decision error correction coding on each multilevel modulation symbol by using an information bit assigned to the least significant bit of each multilevel modulation symbol and an information bit assigned to a middle bit of each multilevel modulation symbol.

CITATION LIST

Non Patent Literature

Non Patent Literature 1: K. Sugitani et al., "Partial multilevel coding with probabilistic shaping for low-power optical transmission", Proc. OECC/PSC 2019, Paper TuB1-5.

SUMMARY OF INVENTION

Technical Problem

The error correction coding device disclosed in Non Patent Literature 1 has a problem that the larger the number of middle bits of the multilevel modulation symbol and the larger the number of multilevel modulation symbols, the larger the operation amount of the soft decision error correction coding processing.

The present disclosure has been made to solve the above problem, and an object thereof is to obtain an error correction coding device capable of reducing the operation amount of soft decision error correction coding processing as compared with the error correction coding device disclosed in Non Patent Literature 1 when the number of middle bits of a multilevel modulation symbol and the number of multilevel modulation symbols each increase.

Solution to Problem

An error correction coding device according to the present disclosure includes processing circuitry configured to; acquire information bit strings that are labels of respective multilevel modulation symbols from a frame in which a plurality of information bit strings that are labels of the plurality of multilevel modulation symbols are arranged, and operate an exclusive OR of bits of information bit strings that are labels of the respective multilevel modulation symbols; generate soft decision error correction redundancy bits by performing soft decision error correction coding on a plurality of operation results of the exclusive OR; acquire the plurality of information bit strings that are the labels of respective multilevel modulation symbols from the frame and generate hard decision error correction redundancy bits by performing hard decision error correction coding on the plurality of information bits; and generate a plurality of pulse amplitude modulation symbols from a part of the labels of the respective multilevel modulation symbols or all of the labels of the respective multilevel modulation symbols, the hard decision error correction redundancy bits, and the soft decision error correction redundancy bits; wherein when a dimension of each of a plurality of bits that are labels of respective multilevel modulation symbols is D (D is an integer equal to or more than 1), and a number of bits of each of the multilevel modulation symbols is D×M (M is an integer equal to or more than 2), the processing circuitry generates each of the pulse amplitude modulation symbols that are symbols of a first dimension of respective multilevel modulation symbols by performing reflection binary gray coding on D×M bits included in each of the multilevel modulation symbols.

Advantageous Effects of Invention

According to the present disclosure, when the number of middle bits of a multilevel modulation symbol and the number of multilevel modulation symbols each increase, it is possible to reduce the operation amount of soft decision error correction coding processing as compared with the error correction coding device disclosed in Non Patent Literature 1.

BRIEF DESCRIPTION OF DRAWINGS

FIG. 3 is a hardware configuration diagram of a computer in a case where the error correction coding device is implemented by software, firmware, or the like.

FIG. 11A is an explanatory diagram illustrating a correspondence between a signal point position and a bit string that is a label of the signal point position in a case where two 8-value pulse amplitude modulation symbols are arranged in a real part and an imaginary part, and FIG. 11B is an explanatory diagram illustrating an exclusive OR operation result of a bit string that is a label corresponding to each signal point in FIG. 11A.

DESCRIPTION OF EMBODIMENTS

Hereinafter, in order to describe the present disclosure in more detail, modes for carrying out the present disclosure will be described with reference to the accompanying drawings.

First Embodiment

Figure 1:
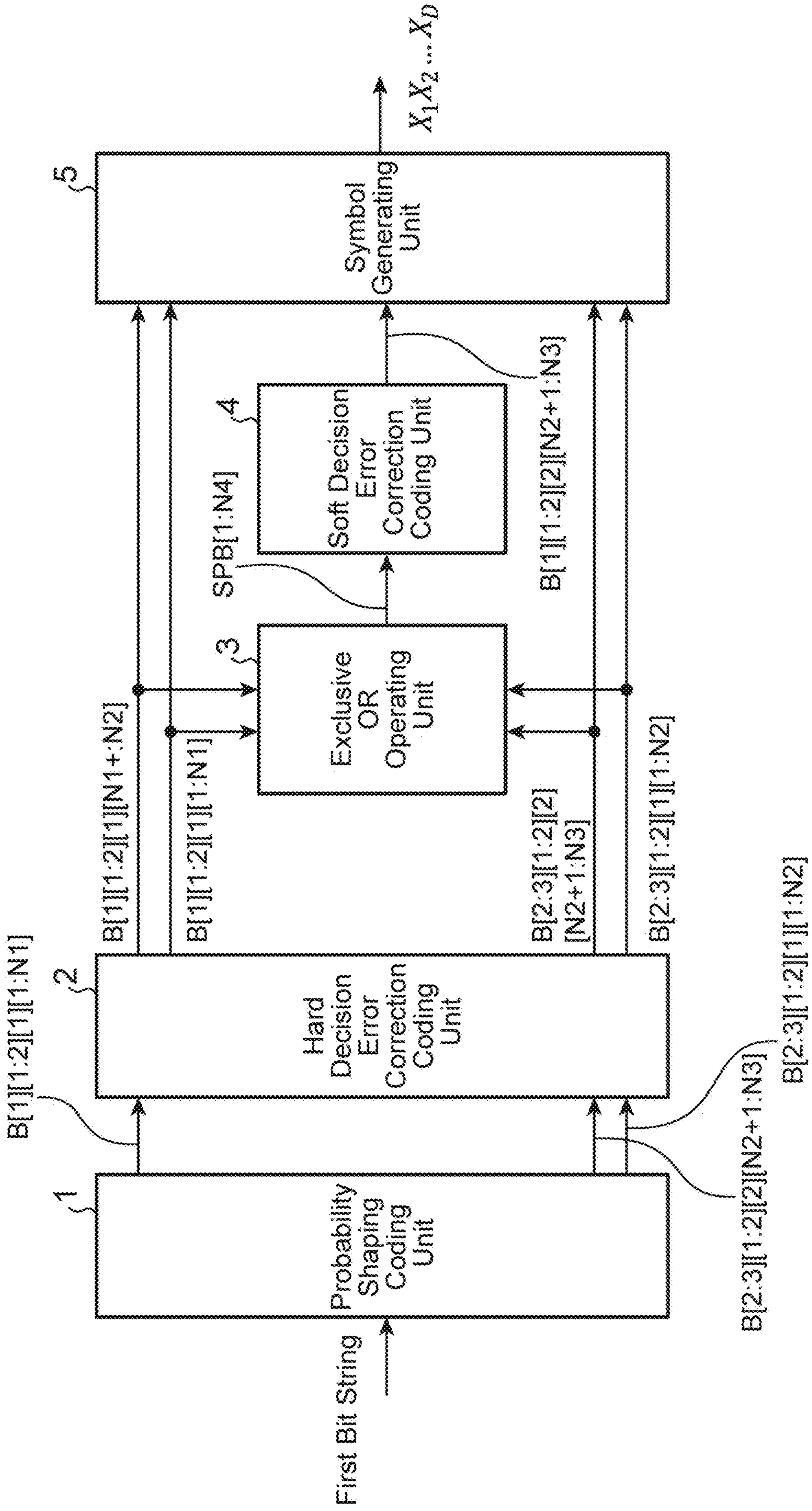
FIG. 1 is a configuration diagram illustrating an error correction coding device according to a first embodiment.

FIG. 1 is a configuration diagram illustrating an error correction coding device according to a first embodiment.

Figure 2:
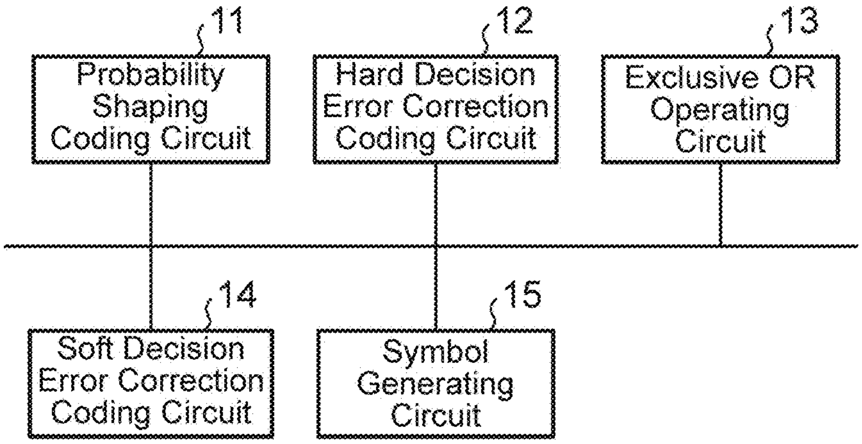
FIG. 2 is a hardware configuration diagram illustrating hardware of the error correction coding device according to the first embodiment.

FIG. 2 is a hardware configuration diagram illustrating hardware of the error correction coding device according to the first embodiment.

The error correction coding device illustrated in FIG. 1 is mounted on a transmission device (not illustrated), for example. The error correction coding device illustrated in FIG. 1 includes a probability shaping coding unit 1, a hard decision error correction coding unit 2, an exclusive OR operating unit 3, a soft decision error correction coding unit 4, and a symbol generating unit 5.

Since the transmission device (not illustrated) includes the error correction coding device illustrated in FIG. 1, the reception device (not illustrated) can correct, for example, a bit error occurred in the communication path.

The probability shaping coding unit 1 is implemented by, for example, a probability shaping coding circuit 11 illustrated in FIG. 2.

A first bit string to be communicated is provided from the outside to the probability shaping coding unit 1.

The probability shaping coding unit 1 performs probability shaping coding on the first bit string. Since the probability shaping coding unit 1 performs the probability shaping coding, when the first bit string is converted into a multilevel modulation symbol by the subsequent processing, the occurrence probability of a signal point is biased, and communication quality is improved.

The probability shaping coding unit 1 uses a second bit string, which is the first bit string after the probability shaping coding, as the information bit string, and outputs a frame in which a plurality of information bit strings is arranged to the hard decision error correction coding unit 2.

The hard decision error correction coding unit 2 is implemented by, for example, a hard decision error correction coding circuit 12 illustrated in FIG. 2.

The hard decision error correction coding unit 2 acquires a frame from the probability shaping coding unit 1.

The hard decision error correction coding unit 2 acquires a plurality of information bit strings from the frame. The second bit string, which is a label of the multilevel modulation symbol, includes a most significant bit (hereinafter referred to as "MSB") corresponding to the number of dimensions D, middle bits (hereinafter referred to as "SSB") corresponding to the number of dimensions D×K, and a least significant bit (hereinafter referred to as "LSB") corresponding to the number of dimensions D. The SSBs are bits that are present between the MSB and the LSB. Unless hard decision error correction redundancy bits and soft decision error correction redundancy bits are included, a complete label cannot be obtained. In such a case, the second bit string is part of the label of the multilevel modulation symbol. D indicates the number of dimensions of each of a plurality of bits included in the multilevel modulation symbol. D is an integer equal to or more than 1. K is an integer equal to or more than 0. When K=0, M=2, and in this case, the second bit string includes an MSB and an LSB and does not include the SSBs.

The hard decision error correction coding unit 2 generates hard decision error correction redundancy bits by performing hard decision error correction coding on a plurality of acquired information bits.

The hard decision error correction coding unit 2 stores the hard decision error correction redundancy bits in a hard decision error correction redundancy bit storage area in the frame.

The hard decision error correction coding unit 2 outputs the frame after the hard decision error correction redundancy bit is stored to each of the exclusive OR operating unit 3 and the symbol generating unit 5.

The exclusive OR operating unit 3 is implemented by, for example, an exclusive OR operating circuit 13 illustrated in FIG. 2.

The exclusive OR operating unit 3 acquires the frame from the hard decision error correction coding unit 2.

The exclusive OR operating unit 3 acquires a plurality of information bit strings that are labels of respective multilevel modulation symbols from the frame, and operates the exclusive OR of the plurality of information bits.

The exclusive OR operating unit 3 outputs a set division bit indicating an operation result of each exclusive OR to the soft decision error correction coding unit 4.

The soft decision error correction coding unit 4 is implemented by, for example, a soft decision error correction coding circuit 14 illustrated in FIG. 2.

The soft decision error correction coding unit 4 acquires a plurality of set division bits from the exclusive OR operating unit 3.

The soft decision error correction coding unit 4 generates soft decision error correction redundancy bits by performing soft decision error correction coding on the operation result of the exclusive OR indicated by the plurality of set division bits.

The soft decision error correction coding unit 4 outputs the soft decision error correction redundancy bits to the symbol generating unit 5.

The symbol generating unit 5 is implemented by, for example, a symbol generating circuit 15 illustrated in FIG. 2.

The symbol generating unit 5 acquires a frame from the hard decision error correction coding unit 2 and acquires the soft decision error correction redundancy bits from the soft decision error correction coding unit 4.

The symbol generating unit 5 acquires the second bit string from the frame, and generates a plurality of pulse amplitude modulation symbols from the second bit string, the hard decision error correction redundancy bits, and the soft decision error correction redundancy bits. The second bit string is a part of the label of each multilevel modulation symbol or the entire label of each multilevel modulation symbol.

The symbol generating unit 5 outputs a communication symbol sequence in which a plurality of pulse amplitude modulation symbols is arranged to a reception device (not illustrated) via a communication path (not illustrated).

In FIG. 1, it is assumed that each of the probability shaping coding unit 1, the hard decision error correction coding unit 2, the exclusive OR operating unit 3, the soft decision error correction coding unit 4, and the symbol generating unit 5, which are components of the error correction coding device, is implemented by dedicated hardware as illustrated in FIG. 2. That is, it is assumed that the error correction coding device is implemented by the probability shaping coding circuit 11, the hard decision error correction coding circuit 12, the exclusive OR operating circuit 13, the soft decision error correction coding circuit 14, and the symbol generating circuit 15.

Each of the probability shaping coding circuit 11, the hard decision error correction coding circuit 12, the exclusive OR operating circuit 13, the soft decision error correction coding circuit 14, and the symbol generating circuit 15 corresponds to, for example, a single circuit, a composite circuit, a programmed processor, a parallel-programmed processor, an application specific integrated circuit (ASIC), a field-programmable gate array (FPGA), or a combination thereof.

The components of the error correction coding device are not limited to those implemented by dedicated hardware, and the error correction coding device may be implemented by software, firmware, or a combination of software and firmware.

The software or firmware is stored in a memory of the computer as a program. The computer means hardware that executes a program, and corresponds to, for example, a central processing unit (CPU), a graphics processing unit (GPU), a central processing unit, a processing unit, an arithmetic unit, a microprocessor, a microcomputer, a processor, or a digital signal processor (DSP).

Figure 3:
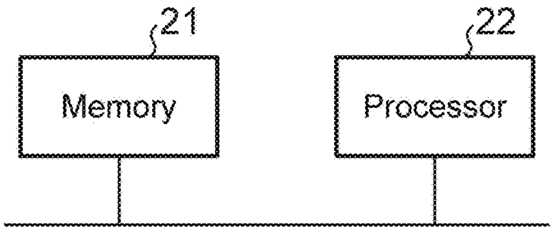

FIG. 3 is a hardware configuration diagram of a computer in a case where the error correction coding device is implemented by software, firmware, or the like.

In a case where the error correction coding device is implemented by software, firmware, or the like, a program for causing a computer to execute respective processing procedures in the probability shaping coding unit 1, the hard decision error correction coding unit 2, the exclusive OR operating unit 3, the soft decision error correction coding unit 4, and the symbol generating unit 5 is stored in the memory 21. Then, a processor 22 of the computer executes the program stored in the memory 21.

Furthermore, FIG. 2 illustrates an example in which each of the components of the error correction coding device is implemented by dedicated hardware, and FIG. 3 illustrates an example in which the error correction coding device is implemented by software, firmware, or the like. However, this is merely an example, and some components in the error correction coding device may be implemented by dedicated hardware, and the remaining components may be implemented by software, firmware, or the like.

Next, an operation of the error correction coding device illustrated in FIG. 1 will be described.

Figure 4:
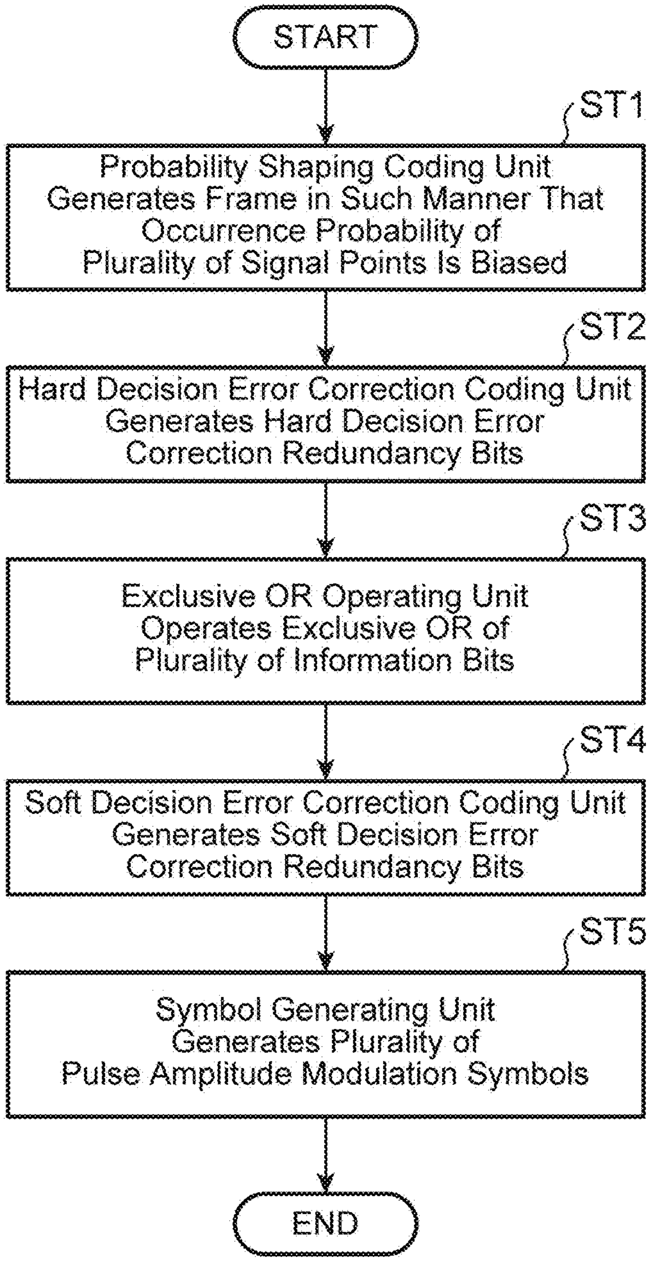
FIG. 4 is a flowchart illustrating an error correction coding method which is a processing procedure of the error correction coding device.

FIG. 4 is a flowchart illustrating an error correction coding method which is a processing procedure of the error correction coding device.

Figure 5A:
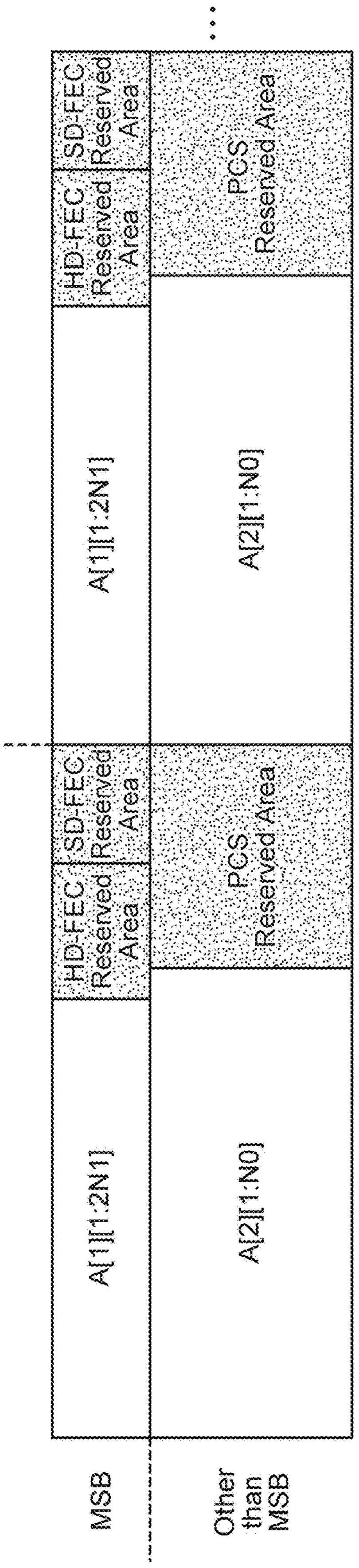
FIG. 5A is an explanatory diagram illustrating an example of a first bit string provided to a probability shaping coding unit 1.

The probability shaping coding unit 1 acquires a first bit string to be communicated as illustrated in FIG. 5A from the outside.

FIG. 5A is an explanatory diagram illustrating an example of the first bit string provided to the probability shaping coding unit 1.

In the first bit string, a plurality of frames is arranged. Each frame is divided into an MSB and a portion other than the MSB.

Each of A[1][1:2N1] assigned to the MSB and A[2][1:NO] assigned to other than the MSB is an information bit. Each of N1 and N0 is an integer equal to or more than 1.

[1:2N1] is a symbol that means from the first column to the (2×N1)-th column. [1:NO] is a symbol meaning from the first column to the N0-th column.

An HD-FEC reserved area assigned to the MSB is the hard decision error correction redundancy bit storage area and stores a first dummy bit.

An SD-FEC reserved area assigned to the MSB is a soft decision error correction redundancy bit storage area and stores a second dummy bit.

A probabilistic constellation shaping (PCS) reserved area assigned other than the MSB is an area for storing bits increased by probability shaping coding, and stores a third dummy bit.

The probability shaping coding unit 1 performs probability shaping coding on the first bit string to be communicated.

That is, the probability shaping coding unit 1 generates a frame in such a manner that the occurrence probability of the plurality of signal points in pulse amplitude modulation symbols $X_j$ (j=1, . . . , D) generated by the symbol generating unit 5 is biased by performing the probability shaping coding on the first bit string (step ST1 in FIG. 4).

The probability shaping coding unit 1 outputs a frame in which a plurality of second bit strings, which are the first bit strings after the probability shaping coding, are arranged to the hard decision error correction coding unit 2.

Figure 5B:
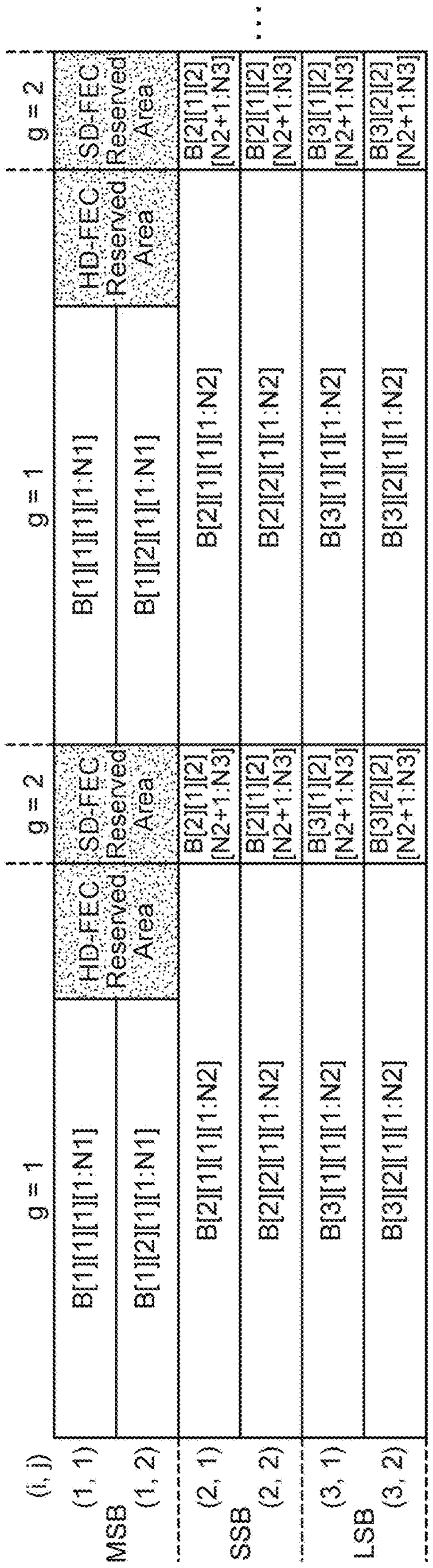
FIG. 5B is an explanatory diagram illustrating a frame generated by the probability shaping coding unit 1.

FIG. 5B is an explanatory diagram illustrating the frame generated by the probability shaping coding unit 1.

The frame generated by the probability shaping coding unit 1 has a group "1" (g=1) and a group "2" (g=2). The group "1" is a first group and the group "2" is a second group.

The group "1" includes a multilevel modulation symbol in which neither the first dummy bit nor the second dummy bit is included in the MSB or a label of the multilevel modulation symbol, and a multilevel modulation symbol in which the first dummy bit is included in the MSB or a label of the multilevel modulation symbol.

The group "2" is a group including the SD-FEC reserved area assigned to the MSB. That is, the group "2" includes the multilevel modulation symbol in which the second dummy bit is included in the MSB or a label of the multilevel modulation symbol.

In the example of FIG. 5, D=2. j is a dimension index indicating a dimension, j=1 indicates a first dimension, and j=2 indicates a second dimension.

The number of bits of the D-dimensional multilevel modulation symbol is D×M. M is an integer equal to or more than 2. In the example of FIG. 5, M=3, and the number of bits of the D-dimensional multilevel modulation symbol is 6 (=2×3). i is a bit sequence index, and since M=3 in the example of FIGS. 5, i=1, 2, and 3.

The bits of the multilevel modulation symbol are represented as B[i][j][g][c]. g is a group index, and c is a column index. c=[1:N1] means the first to N1-th columns.

As illustrated in FIG. 5B, the probability shaping coding unit 1 assigns A[1][1:2N1] assigned to the MSB in FIG. 5A to B[1][1][1][1:N1] in the first dimension and B[1][2][1][1:N1] in the second dimension.

Specifically, for example, the probability shaping coding unit 1 assigns A[1][1] to the first dimension (i, j)=(1, 1) in the first column of the MSB as B[1][1][1][1], and assigns A[1][2] to the second dimension (i, j)=(1, 2) in the first column of the MSB as B[1][2][1][1].

In addition, for example, the probability shaping coding unit 1 assigns A[1][3] to the first dimension (i, j)=(1, 1) in the second column of the MSB as B[1][1][1][2], and assigns A[1][4] to the second dimension (i, j)=(1, 2) in the second column of the MSB as B[1][2][1][2].

In FIG. 5B, the probability shaping coding unit 1 converts A[2][1:N0] assigned other than the MSB into 4×N3 bits subjected to probability shaping. N3 is an integer equal to or more than 1.

For example, the probability shaping coding unit 1 assigns B[2][1][1][1:N2] to the first dimension (i, j)=(2, 1) of the SSB in the group "1", and assigns B[2][1][2][N2+1:N3] to the first dimension (i, j)=(2, 1) of the SSB in the group "2".

For example, the probability shaping coding unit 1 assigns B[2][2][1][1:N2] to the second dimension (i, j)=(2, 2) of the SSB in the group "1", and assigns B[2][1][2][N2+1:N3] to the second dimension (i, j)=(2, 2) of the SSB in the group "2".

For example, the probability shaping coding unit 1 assigns B[3][1][1][1:N2] to the first dimension (i, j)=(3, 1) of the LSB in the group "1", and assigns B[3][1][2][N2+1:N3] to the first dimension (i, j)=(3, 1) of the LSB in the group "2".

For example, the probability shaping coding unit 1 assigns B[3][2][1][1:N2] to the second dimension (i, j)=(3, 2) of the LSB in the group "1", and assigns B[3][2][2][N2+1:N3] to the second dimension (i, j)=(3, 2) of the LSB in the group "2".

The first dummy bit is stored in the HD-FEC reserved area assigned to the MSB, and the second dummy bit is stored in the SD-FEC reserved area assigned to the MSB.

Figure 6A:
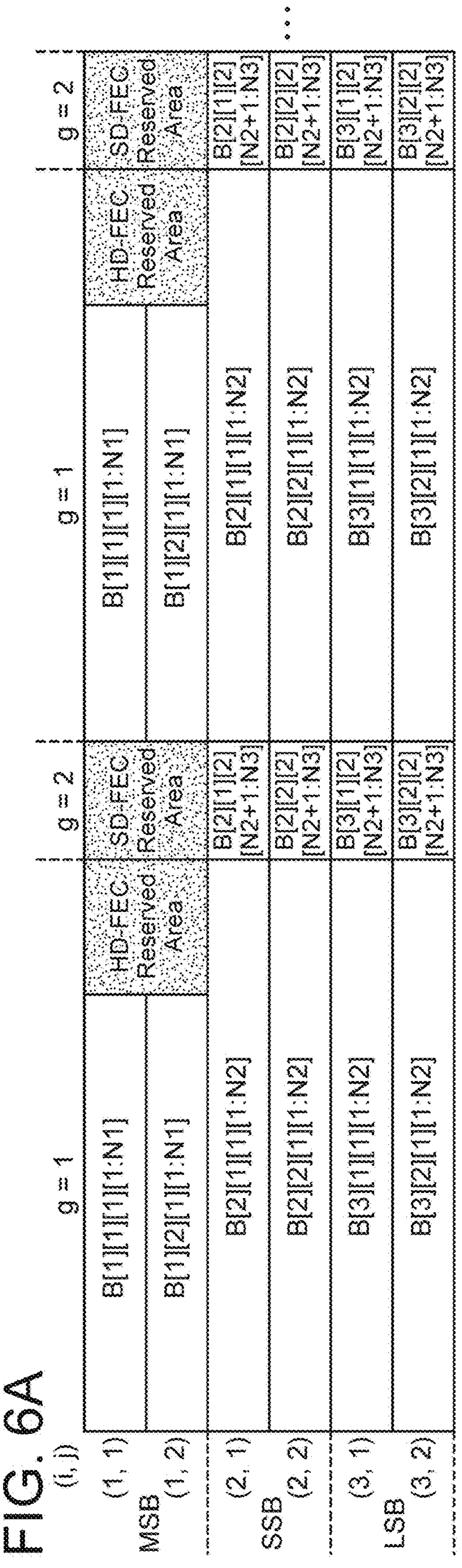
FIG. 6A is an explanatory diagram illustrating a frame output from the probability shaping coding unit 1 to a hard decision error correction coding unit 2.

The hard decision error correction coding unit 2 acquires a frame as illustrated in FIG. 6A from the probability shaping coding unit 1.

FIG. 6A is an explanatory diagram illustrating a frame output from the probability shaping coding unit 1 to the hard decision error correction coding unit 2.

The hard decision error correction coding unit 2 acquires a plurality of information bits that is a part of labels of a plurality of multilevel modulation symbols from the frame.

Specifically, the hard decision error correction coding unit 2 acquires each of B[1][1][1][c], B[1][2][1][c], B[2][1][1][c], B[2][2][1][c], B[3][1][1][c], and B[3][2][1][c] as the D×M information bits included in the multilevel modulation symbol arranged in the c-th column (c=1, . . . , N2). However, the hard decision error correction coding unit 2 does not acquire the first dummy bit stored in the HD-FEC reserved area.

Further, the hard decision error correction coding unit 2 acquires B[2][1][2][c], B[2][2][2][c], B[3][1][2][c], and B[3][2][2][c] as D×(M−1) information bits included in the multilevel modulation symbol arranged in the c-th column (c=N2+1, . . . , N3).

Figure 6B:
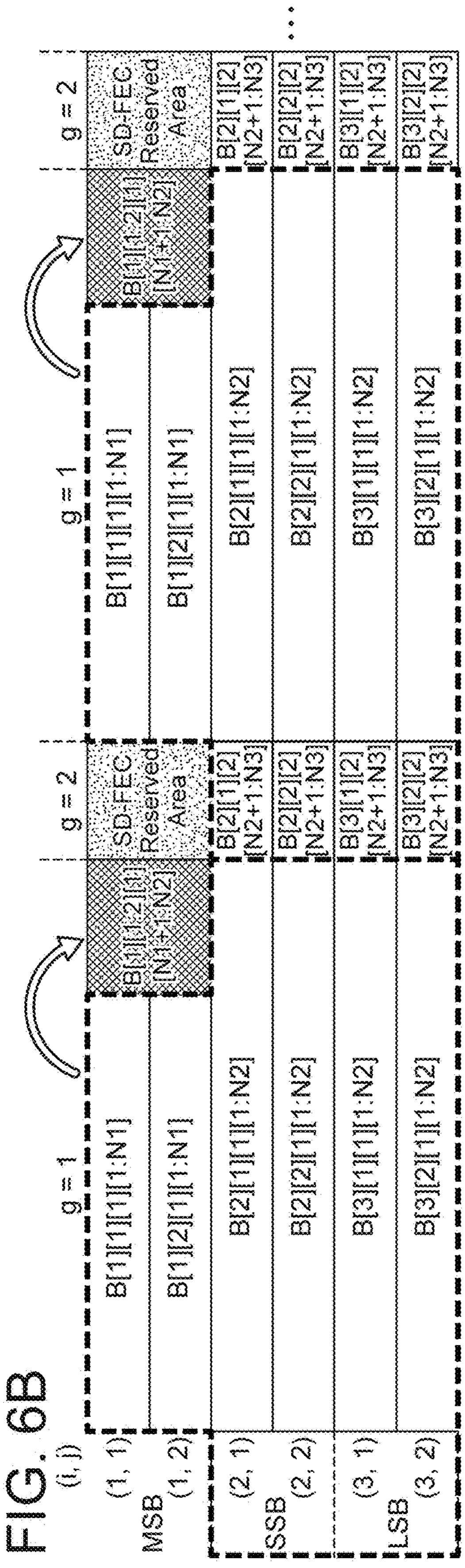
FIG. 6B is an explanatory diagram illustrating a frame output from the probability shaping coding unit 1 to the hard decision error correction coding unit 2.

After acquiring the D×M information bits and the like included in the multilevel modulation symbol arranged in the c-th column (c=1, . . . , N2), the hard decision error correction coding unit 2 sets the information bits included in a portion surrounded by a broken line to the HD-FEC information bits as illustrated in FIG. 6B. The HD-FEC information bits are bits to be subjected to hard decision error correction coding.

The information bits included in the portion surrounded by the broken line are B[2:3][1:2][2][N2+1:N3], B[1][1:2][1][1:N1], and B[2:3][1:2][1][1:N2].

The hard decision error correction coding unit 2 generates hard decision error correction redundancy bits by performing the hard decision error correction coding on the HD-FEC information bits (step ST2 in FIG. 4). The hard decision error correction coding processing itself is a known technique, and thus detailed description thereof will be omitted.

As the hard decision error correction code used in the hard decision error correction coding process, a known code such as a BCH code, a Staircase code, or a Zipper code can be used. The BCH code is disclosed in, for example, "R. Bose and D. Ray-Chaudhuri, "On a class of error correcting binary group codes," Information and Control, vol. 3, no. 1, pp. 68-79, March 1960".

The Staircase code is disclosed in, for example, "B. P. Smith et al., "Staircase codes: FEC for 100 Gb/s OTN," J. Lightw. Technol., vol. 30, no. 1, pp. 110-117, January 2012, doi: 10.1109/JLT. 2011.2175479".

The Zipper code is disclosed in, for example, "A. Y. Sukmadji et al., "Zipper codes: Spatially-coupled product-like codes with iterative algebraic decoding," Canadian Workshop on Information Theory (CWIT), Hamilton, ON, Canada, June 2019, pp. 1-6, doi: 10.1109/CWIT. 2019.8929906".

As illustrated in FIG. 6B, the hard decision error correction coding unit 2 stores the generated hard decision error correction redundancy bits as B[1][1:2][1][N1+1:N2] in the HD-FEC reserved area assigned to the MSB. That is, the hard decision error correction coding unit 2 stores the hard decision error correction redundancy bits in the HD-FEC reserved area instead of the first dummy data stored in the HD-FEC reserved area.

FIG. 6B is an explanatory diagram illustrating a frame in which the hard decision error correction redundancy bits are stored in the HD-FEC reserved area.

The hard decision error correction coding unit 2 outputs the frame after the hard decision error correction redundancy bit is stored to each of the exclusive OR operating unit 3 and the symbol generating unit 5.

The hard decision error correction coding unit 2 may rearrange the bit positions after performing the hard decision error correction coding on the HD-FEC information bits. By rearranging the bit positions, it is possible to reduce the influence of continuous bit errors occurring in the communication path before decoding.

Figure 7A:
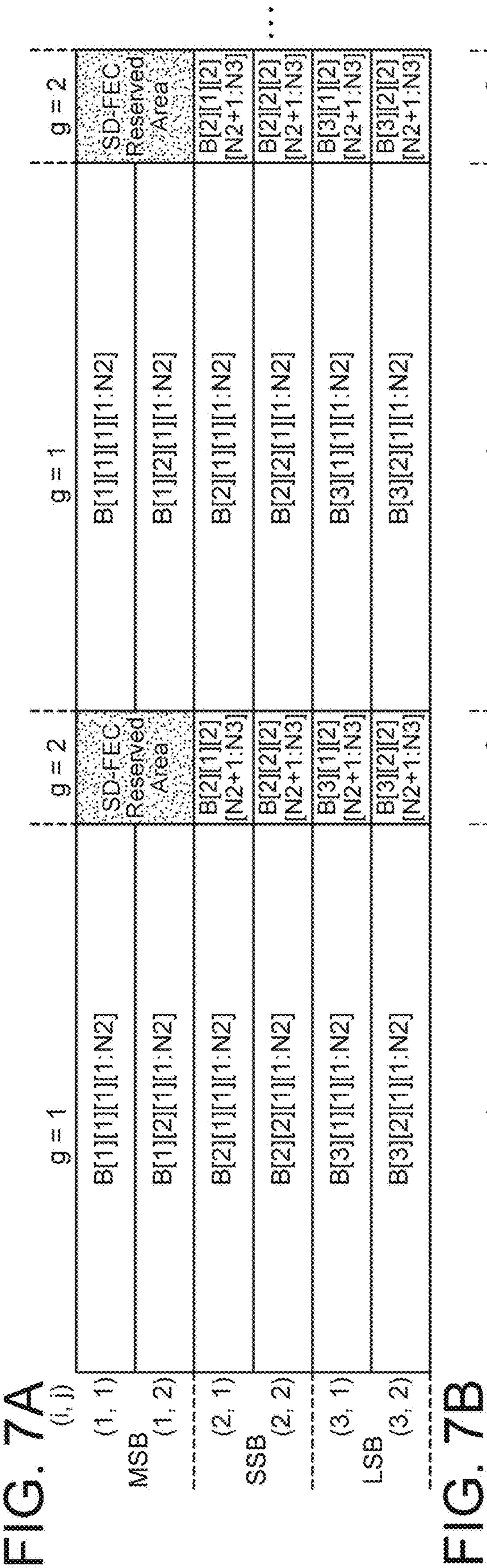
FIG. 7A is an explanatory diagram illustrating a frame output from the hard decision error correction coding unit 2 to an exclusive OR operating unit 3.

As illustrated in FIG. 7A, the exclusive OR operating unit 3 acquires the frame after the hard decision error correction redundancy bit is stored from the hard decision error correction coding unit 2.

FIG. 7A is an explanatory diagram illustrating the frame output from the hard decision error correction coding unit 2 to the exclusive OR operating unit 3. The frame illustrated in FIG. 7A is the same as the frame illustrated in FIG. 6B.

Figure 8:
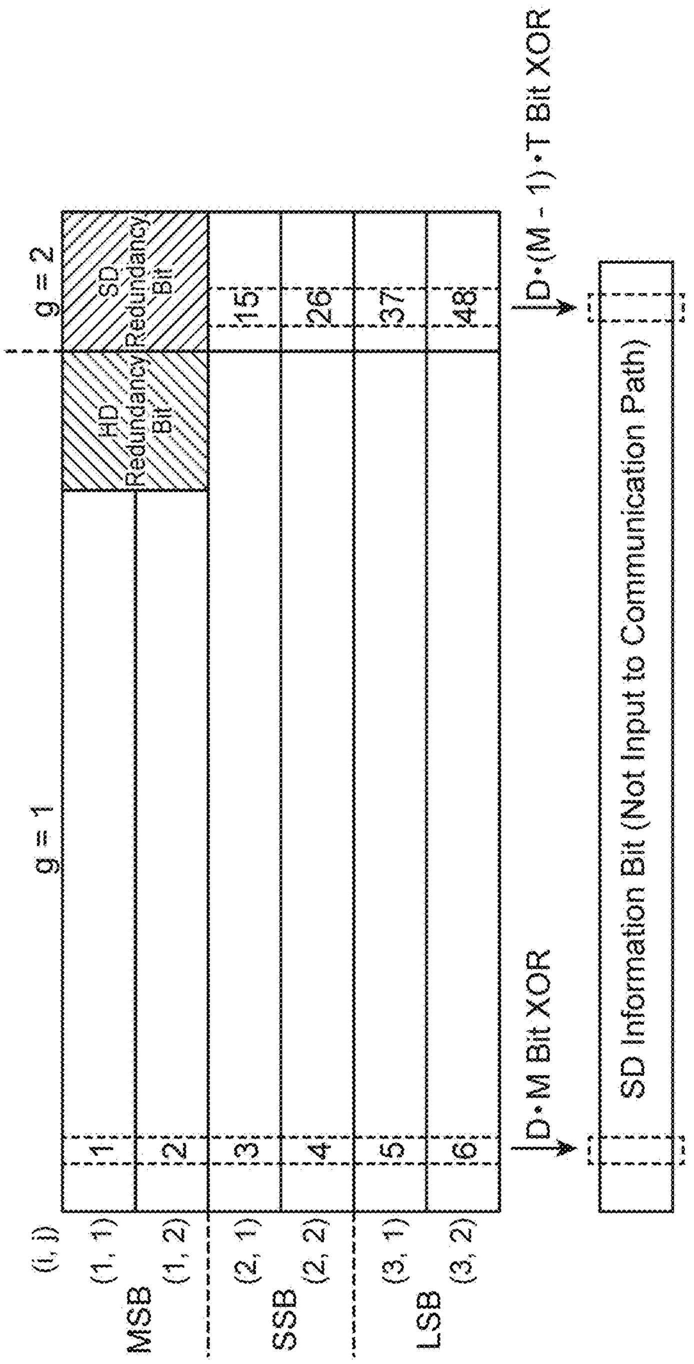
FIG. 8 is an explanatory diagram illustrating exclusive OR operation processing by the exclusive OR operating unit 3.

FIG. 8 is an explanatory diagram illustrating exclusive OR operation processing by the exclusive OR operating unit 3.

The exclusive OR operating unit 3 acquires a plurality of information bits that is a part of the label of each multilevel modulation symbol from the frame.

Specifically, as illustrated in FIG. 8, the exclusive OR operating unit 3 acquires each of B[1][1][1][c], B[1][2][1][c], B[2][1][1][c], B[2][2][1][c], B[3][1][1][c], and B[3][2][1][c] as D×M information bits which are arranged in the c-th column (c=1, . . . , N2) and are labels of the multilevel modulation symbols from the frame of the group "1".

"123456" illustrated in FIG. 8 indicates the order of bits from (i, j)=(1, 1) to (i, j)=(3, 2), and does not indicate a value stored in B[1][1][1][c] or the like. A value stored in B[1][1][1][c] or the like is "0" or "1".

From the frame of the group "2", the exclusive OR operating unit 3 acquires D×(M−1) information bits which are labels of multilevel modulation symbols. T is an integer equal to or more than 1 set in such a manner that D×(M−1)×T is an integer.

In a case of T=2, as illustrated in FIG. 8, the exclusive OR operating unit 3 acquires each of B[2][1][2][c], B[2][2][2][c: c], B[3][1][2][c] and B[3][2][2][c] as D×(M−1) information bits arranged in the c-th column (c=N2+1, . . . , N3) from the frame of the group "2".

Further, the exclusive OR operating unit 3 acquires B[2][1][2][c+1], B[2][2][2][c+1], B[3][1][2][c+1], and B[3][2][2][c+1] as D×(M−1) information bits arranged in the (c+1)-th column (c=N2+1, . . . , N3).

"12345678" illustrated in FIG. 8 indicates the order of bits from the first dimension of (i, j)=(2, 1) to the second dimension of (i, j)=(3, 2), and does not indicate a value stored in B[2][1][2][c+1] or the like. A value stored in B[2][1][2][c+1] or the like is "0" or "1".

As illustrated in FIG. 8, when the exclusive OR operating unit 3 acquires each of the bit strings of D×M information bits as N2 bit strings from the frame of the group "1", the exclusive OR operating unit 3 operates the exclusive OR of the D×M information bits included in each of the bit strings (step ST3 in FIG. 4). However, the hard decision error correction redundancy bits included in the HD-FEC reserved area are not included in the operation target of the exclusive OR.

Further, as illustrated in FIG. 8, when the exclusive OR operating unit 3 acquires the bit strings of D×(M−1)×T information bits as (N3−N2)/T bit strings from the frame of the group "2", the exclusive OR operating unit 3 operates the exclusive OR of the D×(M−1)×T information bits included in each of the bit strings (step ST3 in FIG. 4).

Figure 7B:
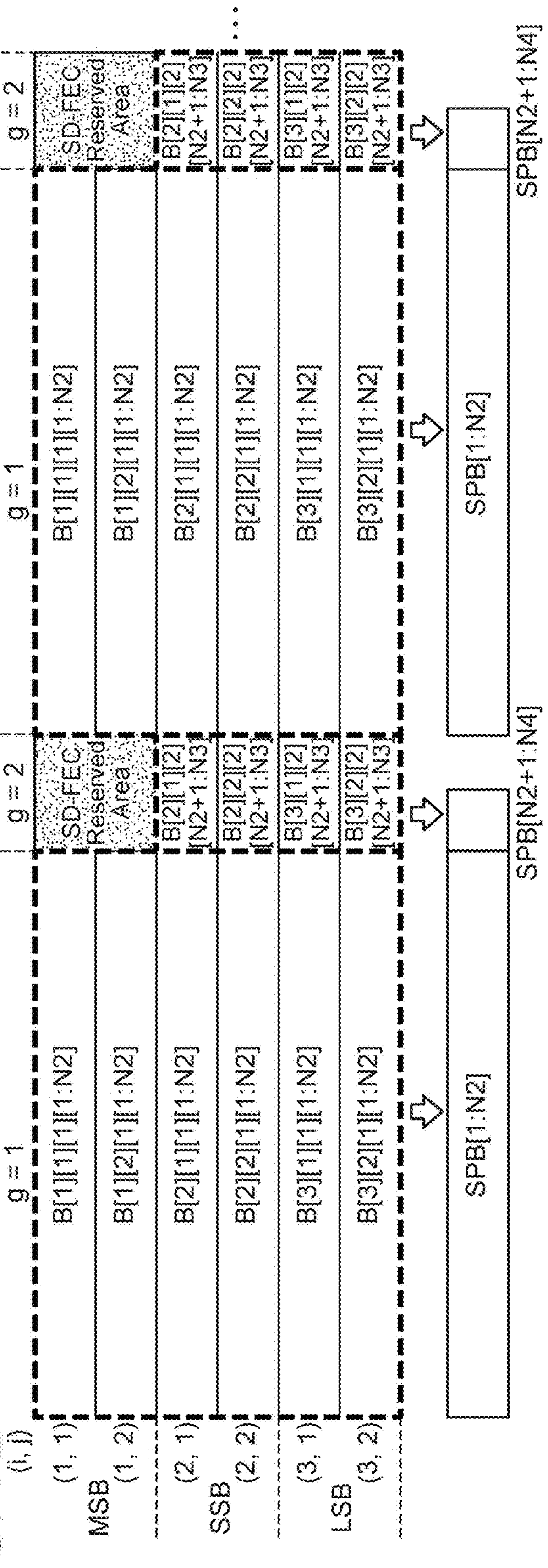
FIG. 7B is an explanatory diagram illustrating a set division bit output from the exclusive OR operating unit 3.

As illustrated in FIG. 7B, the exclusive OR operating unit 3 outputs the set division bits indicating the operation result of the exclusive OR for each of the D×M information bits acquired from the frame of the group "1" to the soft decision error correction coding unit 4 as SPB[1:N2].

As illustrated in FIG. 7B, the exclusive OR operating unit 3 outputs the set division bits indicating the operation result of the exclusive OR for each of the D×(M−1)×T information bits acquired from the frame of the group "2" to the soft decision error correction coding unit 4 as SPB[N2+1:N4]. N4 is an integer equal to or more than 1, and N4≤N3.

FIG. 7B is an explanatory diagram illustrating set division bits output from the exclusive OR operating unit 3.

The operation amount of the exclusive OR by the exclusive OR operating unit 3 is negligibly small as compared with the operation amount of the soft decision error correction coding processing by the soft decision error correction coding unit 4.

Figure 9A:
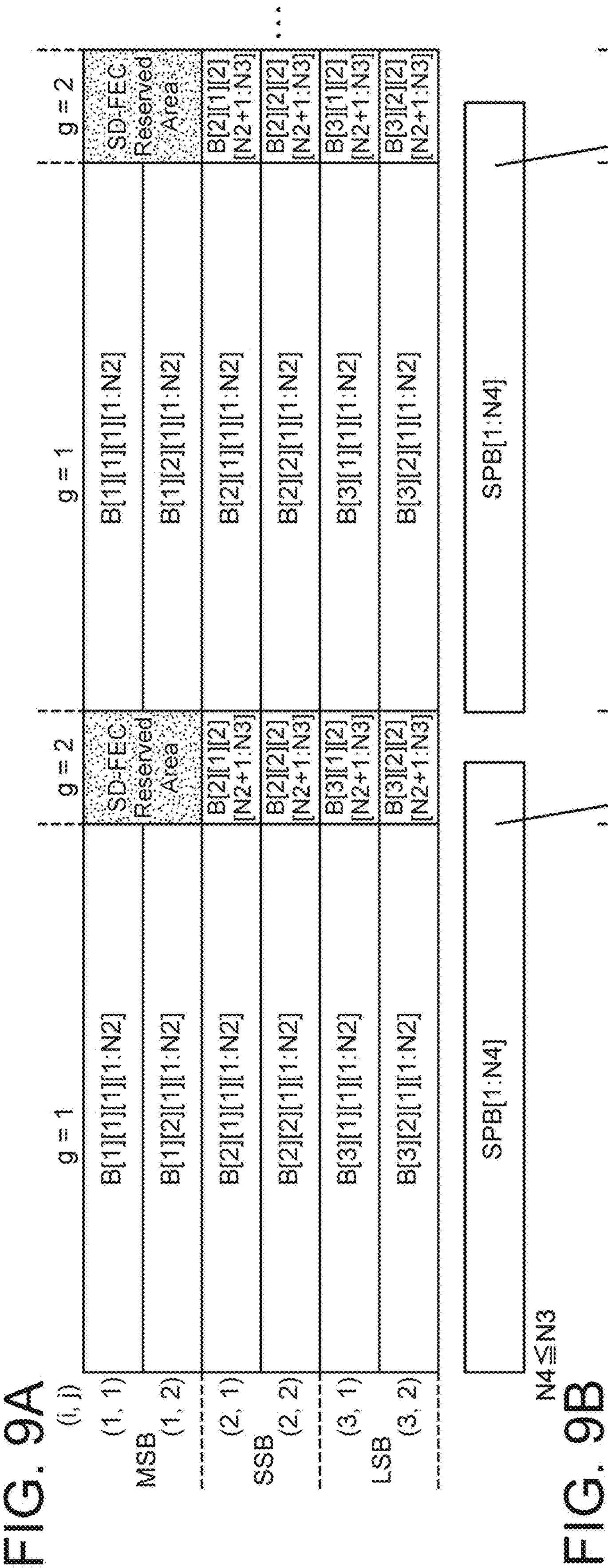
FIG. 9A and FIG. 9B are explanatory diagrams illustrating set division bits to be subjected to soft decision error correction coding by a soft decision error correction coding unit 4.
Figure 9B:
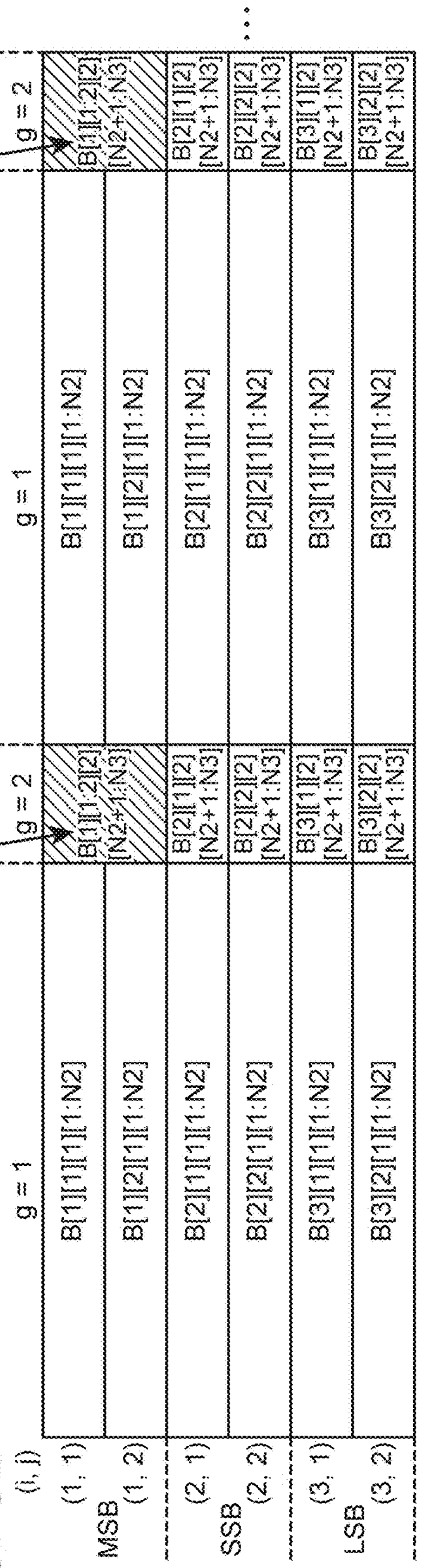

As illustrated in FIG. 9, the soft decision error correction coding unit 4 acquires SPB[1:N4] including SPB[1:N2] and SPB[N2+1:N4] from the exclusive OR operating unit 3.

The soft decision error correction coding unit 4 generates soft decision error correction redundancy bits by performing soft decision error correction coding on the N4 set division bits included in SPB[1:N4] (step ST4 in FIG. 4). The soft decision error correction coding processing itself is a known technique, and thus detailed description thereof will be omitted.

As illustrated in FIG. 9, the soft decision error correction coding unit 4 stores the soft decision error correction redundancy bits as B[1][1:2][2][N2+1:N3] in the SD-FEC reserved area assigned to the MSB. That is, the soft decision error correction coding unit 4 stores the soft decision error correction redundancy bit in the SD-FEC reserved area instead of the second dummy data stored in the SD-FEC reserved area.

The soft decision error correction coding unit 4 outputs the soft decision error correction redundancy bits to the symbol generating unit 5.

FIG. 9 is an explanatory diagram illustrating set division bits to be subjected to the soft decision error correction coding by the soft decision error correction coding unit 4.

One of targets of the soft decision error correction coding processing by the error correction coding device disclosed in Non Patent Literature 1 is all information bits assigned to the LSB of the multilevel modulation symbol and information bits assigned to the SSB of the multilevel modulation symbol of the group 2. In the example of FIG. 9, the targets of the soft decision error correction coding processing are N3 symbols for two information bits of the LSB and N3−N2 symbols for two information bits of the SSB.

Therefore, in the example of FIG. 9, the error correction coding device disclosed in Non Patent Literature 1 performs the soft decision error correction coding on 2×N3+2×(N3−N2) bits.

The number of targets of the soft decision error correction coding processing by the error correction coding device illustrated in FIG. 1 is one. In the example of FIG. 9, the targets of the soft decision error correction coding processing are N4 bits. N4≤N3.

Therefore, the operation amount of the soft decision error correction coding processing by the error correction coding device illustrated in FIG. 1 is smaller by (2×N3+2×(N3−N2)−N4) bits than the operation amount of the soft decision error correction coding processing by the error correction coding device disclosed in Non Patent Literature 1. In the targets of the soft decision coding processing of the pulse amplitude modulation symbols of the D-dimensional 2^M value, it is D×N3+D×(M−2)×(N3−N2) in the case of the error correction coding device disclosed in Non Patent Literature 1, and it is N4 in the case of the error correction coding device illustrated in FIG. 1. Therefore, the error correction coding device illustrated in FIG. 1 has a smaller operation amount than 1/D as compared to the error correction coding device disclosed in Non Patent Literature 1, and the larger each of D, M, and T is, the higher the effect is.

The symbol generating unit 5 acquires the frame from the hard decision error correction coding unit 2 and acquires the soft decision error correction redundancy bits from the soft decision error correction coding unit 4.

Instead of acquiring the frame from the hard decision error correction coding unit 2, the symbol generating unit 5 may acquire the frame after storing the soft decision error correction redundancy bits from the soft decision error correction coding unit 4.

Figure 10A:
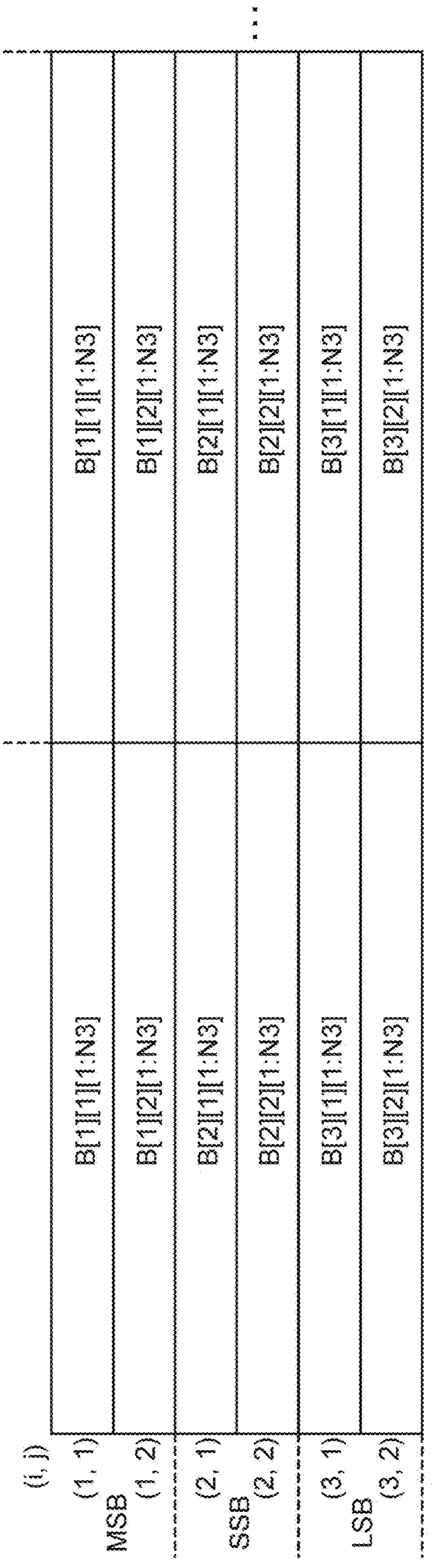
FIG. 10A is an explanatory diagram illustrating a frame in which hard decision error correction redundancy bits and soft decision error correction redundancy bits are stored.

FIG. 10A is an explanatory diagram illustrating a frame in which the hard decision error correction redundancy bits and the soft decision error correction redundancy bits are stored.

The hard decision error correction redundancy bits are stored in the HD-FEC reserved area in the frame illustrated in FIG. 10A, and the soft decision error correction redundancy bits are stored in the SD-FEC reserved area.

However, FIG. 10A does not clearly illustrate each of the HD-FEC reserved area and the SD-FEC reserved area.

Furthermore, in FIG. 10A, dividing into the group "1" and the group "2" is not performed.

For example, in the case of D=2, the symbol generating unit 5 acquires each of B[1][1][c], B[2][1][c], and B[3][1][c] as M information bits which are arranged in the c-th column (c=1, . . . , N3) of the first dimension and are labels of the multilevel modulation symbols from the above frame. Since dividing into the groups is not performed, the group index g of the above information bits is omitted.

Further, the symbol generating unit 5 acquires each of B[1][2][c], B[2][2][c], and B[3][2][c] as M information bits arranged in the c-th column (c=1, . . . , N3) of the second dimension from the above frame.

Figure 10B:
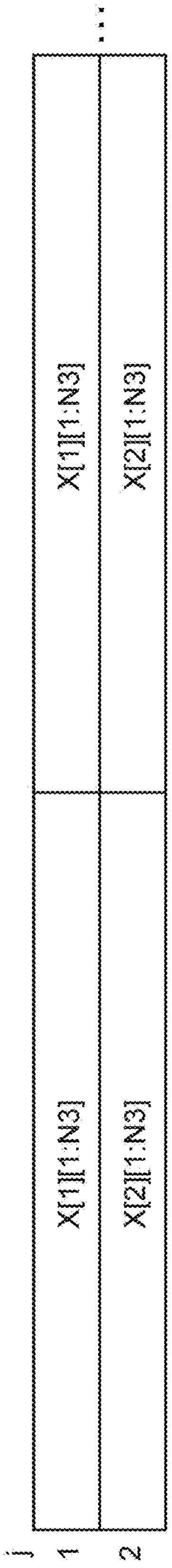
FIG. 10B is an explanatory diagram illustrating a frame in which a pulse amplitude modulation symbol string including X[1][1:N3] and X[2][1:N3] is stored.

In the case of D=2, as illustrated in FIG. 10B, the symbol generating unit 5 generates the pulse amplitude modulation symbols $X_j$ (j=1, . . . , D) from B[1][1][c], B[2][1][c], and B[3][1][c], which are M information bits in the first dimension, and stores the pulse amplitude modulation symbols $X_j$ in the area of X[1][1:N3] (step ST5 in FIG. 4).

In addition, as illustrated in FIG. 10B, the symbol generating unit 5 generates the pulse amplitude modulation symbols $X_j$ from B[1][2][c], B[2][2][c], and B[3][2][c], which are M information bits of the second dimension, and stores the pulse amplitude modulation symbols $X_j$ in the area of X[2][1:N3] (step ST5 in FIG. 4).

FIG. 10B is an explanatory diagram illustrating a frame storing a pulse amplitude modulation symbol string including X[1][1:N3] and X[2][1:N3].

The symbol generating unit 5 outputs a communication symbol sequence in which D pulse amplitude modulation symbols $X_j$ including X[1][1:N3] and X[2][1:N3] are arranged to a reception device (not illustrated) via a communication path (not illustrated).

Here, in a case where the pulse amplitude modulation symbols having a value equal to or less than the M-th power of 2 per dimension is generated, the symbol generating unit 5 can generate the pulse amplitude modulation symbols $X_j$ (j=1, . . . , D) by performing reflected binary gray coding on the D×M bits in such a manner that the bit difference between adjacent symbols is only one bit.

When generating one pulse amplitude modulation symbol, for example, in a case where M=3 and the Euclidean distance between signal points is 2, the symbol generating unit 5 can assign a bit "000" to a symbol "1", a bit "001" to a symbol "3", a bit "011" to a symbol "5", and a bit "010" to a symbol "7" as illustrated in FIG. 11A. In addition, the symbol generating unit 5 can assign a bit "100" to a symbol "−1", a bit "101" to a symbol "−3", a bit "111" to a symbol "−5", and a bit "110" to a symbol "−7".

In addition, the symbol generating unit 5 can assign "0" or "1" to the symbol "−7", the symbol "−5", the symbol "−3", the symbol "−1", the symbol "1", the symbol "3", the symbol "5", or the symbol "7" as illustrated in FIG. 11B by performing exclusive OR on the bits.

FIG. 11A is an explanatory diagram illustrating a correspondence between a signal point position and a bit string that is a label of the signal point position in a case where two 8-value pulse amplitude modulation symbols are arranged in a real part and an imaginary part.

FIG. 11B is an explanatory diagram illustrating an exclusive OR operation result of a bit string which is a label corresponding to each signal point in FIG. 11A. For each signal point, the set division bit takes a value as illustrated in FIG. 11B, and can be divided into two sets of "0" side and "1" side.

In the first embodiment described above, the error correction coding device is configured to include the exclusive OR operating unit 3 to acquire a plurality of information bit strings that are labels of respective multilevel modulation symbols from a frame in which a plurality of information bit strings that are labels of the plurality of multilevel modulation symbols are arranged, and operate an exclusive OR of a plurality of information bits that are labels of the respective multilevel modulation symbols, and the soft decision error correction coding unit 4 to generate soft decision error correction redundancy bits by performing soft decision error correction coding on a plurality of operation results of the exclusive OR by the exclusive OR operating unit 3. Therefore, when the number of middle bits of a multilevel modulation symbol and the number of multilevel modulation symbols each increase, the error correction coding device can reduce the operation amount of soft decision error correction coding processing as compared with the error correction coding device disclosed in Non Patent Literature 1.

Further, in the first embodiment, the error correction coding device is configured to include the hard decision error correction coding unit 2 to acquire a plurality of information bits that are labels of respective multilevel modulation symbols from the frame and generate hard decision error correction redundancy bits by performing hard decision error correction coding on the plurality of information bits, and the symbol generating unit 5 to generate a plurality of pulse amplitude modulation symbols from a part of the labels of the respective multilevel modulation symbols or all of the labels of the respective multilevel modulation symbols, the hard decision error correction redundancy bits, and the soft decision error correction redundancy bits. Therefore, the error correction coding device can generate a plurality of pulse amplitude modulation symbols while suppressing an increase in the operation amount of the soft decision error correction coding processing.

Note that, in the present disclosure, any component of the embodiment can be modified, or any component of the embodiment can be omitted.

INDUSTRIAL APPLICABILITY

The present disclosure is suitable for an error correction coding device and an error correction coding method.

REFERENCE SIGNS LIST

1: probability shaping coding unit, 2: hard decision error correction coding unit, 3: exclusive OR operating unit, 4:

soft decision error correction coding unit, 5: symbol generating unit, 11: probability shaping coding circuit, 12: hard decision error correction coding circuit, 13: exclusive OR operating circuit, 14: soft decision error correction coding circuit, 15: symbol generating circuit, 21: memory, 22: processor

The invention claimed is:

1. An error correction coding device comprising:

processing circuitry configured to acquire information bit strings that are labels of respective multilevel modulation symbols from a frame in which a plurality of information bit strings that are labels of the plurality of multilevel modulation symbols are arranged, and operate an exclusive OR of bits of information bit strings that are labels of the respective multilevel modulation symbols to generate a plurality of operation results of the exclusive OR;

generate soft decision error correction redundancy bits by performing soft decision error correction coding on the plurality of operation results of the exclusive OR;

acquire the plurality of information bit strings that are the labels of respective multilevel modulation symbols from the frame and generate hard decision error correction redundancy bits by performing hard decision error correction coding on the plurality of information bits; and generate a plurality of pulse amplitude modulation symbols from a part of the labels of the respective multilevel modulation symbols or all of the labels of the respective multilevel modulation symbols, the hard decision error correction redundancy bits, and the soft decision error correction redundancy bits; and output a communication symbol sequence in which the plurality of pulse amplitude modulation symbols is arranged to a reception device via a communication path, wherein in response to a dimension of each of a plurality of bits that are labels of respective multilevel modulation symbols is D (D is an integer equal to or more than 1), and a number of bits of each of the multilevel modulation symbols is D×M (Mis an integer equal to or more than 2), the processing circuitry generates each of the pulse amplitude modulation symbols that are symbols of a first dimension of respective multilevel modulation symbols by performing reflection binary gray coding on D×M bits included in each of the multilevel modulation symbols.

2. The error correction coding device according to claim 1, wherein a first dummy bit or a second dummy bit is included in a most significant bit of an information bit string that is a label of a part of multilevel modulation symbols among the plurality of multilevel modulation symbols, and the processing circuitry includes, in the most significant bit including the first dummy bit, the hard decision error correction redundancy bits instead of the first dummy bit, and processing circuitry includes, in the most significant bit including the second dummy bit, the soft decision error correction redundancy bits instead of the second dummy bit.

3. The error correction coding device according to claim 2, wherein the frame includes a first group including a multilevel modulation symbol in which neither the first dummy bit nor the second dummy bit is included in the most significant bit or a label of the multilevel modulation symbol, and a multilevel modulation symbol in which the first dummy bit is included in the most significant bit or a label of the multilevel modulation symbol, and a second group including a multilevel modulation symbol in which the second dummy bit is included in the most significant bit or a label of the multilevel modulation symbol, and the processing circuitry operates an exclusive OR of a plurality of information bits that are labels of the respective multilevel modulation symbols included in the first group, and operates an exclusive OR of a plurality of information bits that are labels of T (T is an integer equal to or more than 1) multilevel modulation symbols included in the second group.

4. The error correction coding device according to claim 1, wherein the processing circuitry is further configured to perform probability shaping coding on a first bit string to be communicated, and output a frame in which the plurality of information bit strings is arranged, the information bit strings each being a second bit string that is the first bit string after the probability shaping coding as an information bit string.

5. An error correction coding method comprising:

acquiring information bit strings that are labels of respective multilevel modulation symbols from a frame in which a plurality of information bit strings that are labels of the plurality of multilevel modulation symbols are arranged, and operating an exclusive OR of bits of information bit strings that are labels of the respective multilevel modulation symbols to generate a plurality of operation results of the exclusive OR;

generating soft decision error correction redundancy bits by performing soft decision error correction coding on the plurality of operation results of the exclusive OR;

acquiring the plurality of information bit strings that are the labels of respective multilevel modulation symbols from the frame and generating hard decision error correction redundancy bits by performing hard decision error correction coding on the plurality of information bits; and generating a plurality of pulse amplitude modulation symbols from a part of the labels of the respective multilevel modulation symbols or all of the labels of the respective multilevel modulation symbols, the hard decision error correction redundancy bits, and the soft decision error correction redundancy bits; and output a communication symbol sequence in which the plurality of pulse amplitude modulation symbols is arranged to a reception device via a communication path, wherein in response to a dimension of each of a plurality of bits that are labels of respective multilevel modulation symbols is D (D is an integer equal to or more than 1), and a number of bits of each of the multilevel modulation symbols is D×M (M is an integer equal to or more than 2), generating each of the pulse amplitude modulation symbols that are symbols of a first dimension of respective multilevel modulation symbols by performing reflection binary gray coding on D×M bits included in each of the multilevel modulation symbols.

* * * * *